United States Patent [19]
Jhung

[11] Patent Number: 5,847,977
[45] Date of Patent: Dec. 8, 1998

[54] METHOD FOR PERFORMING AN INVERSE MODIFIED DISCRETE COSINE TRANSFORM

[75] Inventor: Yon-Hong Jhung, Seongnam, Rep. of Korea

[73] Assignee: Samsung Electronic Co., Ltd., Kyungki-do, Rep. of Korea

[21] Appl. No.: 763,738

[22] Filed: Dec. 11, 1996

[30] Foreign Application Priority Data

Dec. 15, 1995 [KR] Rep. of Korea ..................... 95-50545

[51] Int. Cl.$^6$ ..................................................... G06F 17/14
[52] U.S. Cl. ...................................................... 364/725.03
[58] Field of Search ..................... 364/DIG. 1 MS File, 364/DIG. 2 MS File, 571.02, 576, 607, 725.01, 725.03, 726.01, 726.02, 726.03, 735, 736.01, 736.03

[56] References Cited

PUBLICATIONS

"A Fast Algorithm for the Implementation of Filter Banks Based on Time Domain Aliasing Cancellation", ICASSP, 1991, pp. 2209–2212.
"Digital Audio Compression (AC–3)", ATSC, Dec. 20, 1995, pp. 1–6.

*Primary Examiner*—Robert B. Harrell
*Attorney, Agent, or Firm*—Sughrue, Mion, Zinn, Macpeak & Seas, PLLC

[57] ABSTRACT

A method of performing an inverse modified discrete cosine transform (IMDCT) which reduces the amount of calculation, in which IMDCT values $y_m(r)$ expressed in vector form as $Y_m = CX_m$, where $Y_m$, $C$, and $X_m$ represent matrices are obtained by defining values of $X_k(m)$ for $$0 \leq r \leq \frac{M}{2} - 1;$$

calculating values of $y_m(r)$ for $$0 \leq r \leq \frac{M}{2} - 1$$

with respect to an upper half of an upper portion of $Y_m$ by performing calculation with respect to an upper part of an upper portion of a left half of C and with respect to an upper half of $X_m$; calculating values of $y_m(r)$ with respect to a lower half of the upper portion of $Y_m$ by inverting the values of $y_m(r)$ with respect to the upper half of the upper portion of $Y_m$ and arranging the inverted values in a reverse manner; calculating the values of $y_m(r)$ for $$0 \leq r \leq \frac{M}{2} - 1$$

with respect to an upper half of a lower portion of $Y_m$ by performing calculation with respect to an upper part of a lower portion of the left half of C and with respect to the upper half of $X_m$; and calculating values of $y_m(r)$ with respect to a lower half of the lower portion of $Y_m$ arranging values of $y_m(r)$ in a reverse manner with respect to the upper half of the lower portion of $Y_m$.

8 Claims, 1 Drawing Sheet

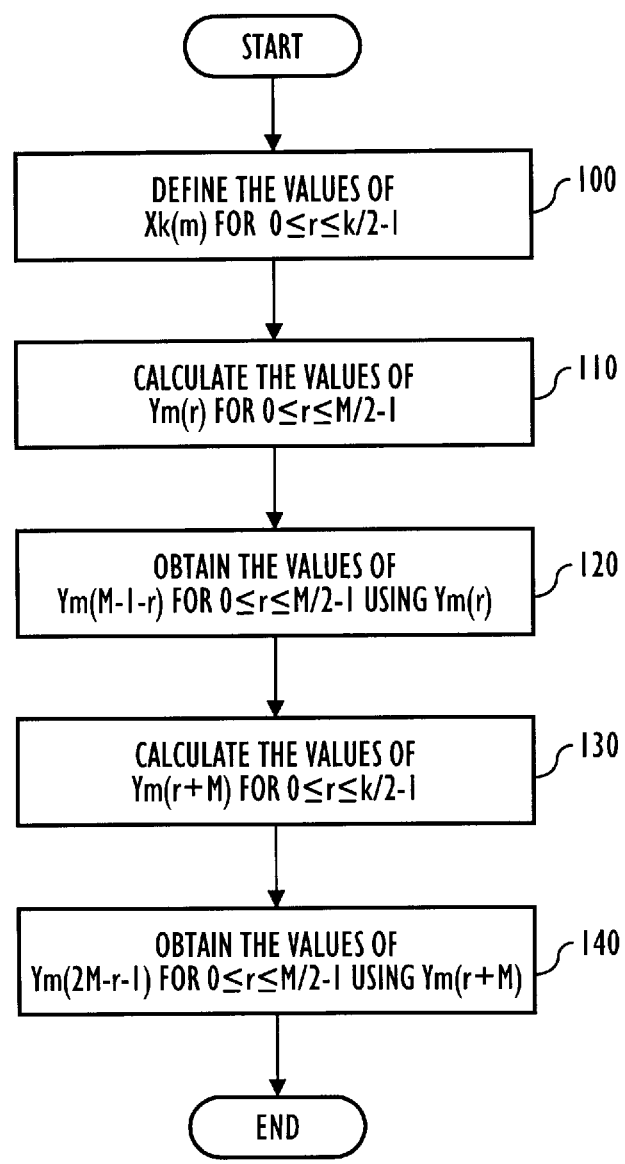
FIGURE

METHOD FOR PERFORMING AN INVERSE MODIFIED DISCRETE COSINE TRANSFORM

BACKGROUND OF THE INVENTION

1. Field of the Invention

The present invention relates to a method for performing an inverse modified discrete cosine transform (IMDCT), and more particularly to a method for performing an IMDCT which can reduce the amount of calculations.

2. Description of the Related Art

Implementing an IMDCT by evaluating a given equation requires a large number of calculations, causing the calculation speed to become very slow. In order to overcome this problem, an implementation using an inverse fast Fourier transform (IFFT) has been proposed. Practically speaking, when implementing the IFFT on semiconductor chips, most of the hardware should be occupied in performing a fast Fourier transform (FFT) calculation operation, which causes severe requirements for interface designs.

The IMDCT is defined as $$y_m(r) = \sum_{k=0}^{K-1} x_k(m) \cos \frac{2\pi}{k} \left( k + \frac{1}{2} \right)(r + n_0) \quad (1)$$

where K is the number of subband channels, $x_k(m)$ are IMDCT coefficients, $$n_0 = \frac{K}{4} + \frac{1}{2},$$

and $0 \leq r \leq K-1$.

In order to calculate equation (1), the values of $y_m(r)$ are obtained by varying the value of r in the range of $0 \leq r \leq K-1$. That is, values of $y_m(0), y_m(1), y_m(2), \ldots, y_m(K-1)$ are respectively obtained by performing K multiplications of the values $x_k(m)$ obtained by varying the value of k in the range of $0 \leq K \leq K-1$ and the cosine values, and then performing K-1 addition operations with respect to the values obtained by the multiplication operations. Specifically, in order to obtain each of the values of $y_m(0), y_m(1), y_m(2), \ldots, y_m(K-1)$, K multiplications and K-1 addition operations are performed. In order to obtain the values of $y_m(r)$ for $0 \leq r \leq K-1$ in a one-block time, a total of $K^2$ multiplication operations and K(K-1) addition operations are required.

As described above, the conventional method for performing an IMDCT has the drawback in that obtaining the value of $y_m(r)$ requires a great deal of processing to perform the required calculations.

SUMMARY OF THE INVENTION

It is an object of the present invention to provide a method for performing an IMDCT which can reduce the amount of calculations required, based on an analysis of the IMDCT characteristics.

In order to achieve the above object, the present invention provides a method of performing an inverse modified discrete cosine transform (IMDCT) on a computing device whereby values of the IMDCT represented by $y_m(r)$ are obtained according to the following equation:

$$y_m(r) = \sum_{k=0}^{K-1} x_k(m) \cos \frac{2\pi}{k} \left( k + \frac{1}{2} \right)(r + n_0)$$

where k is a number of subband channels, $x_k(m)$ are IMDCT coefficients, $$n_0 = \frac{k}{4} + \frac{1}{2},$$

and $0 \leq r \leq K-1$, and $$Y_m = CX_m$$

where $Y_m$ is a matrix of order $1 \times K(=2M)$, C is a matrix of order $K \times K$, and $X_m$ is a matrix of order $1 \times K$, the method comprising:

defining values of $x_k(m)$ for $$0 \leq r \leq \frac{K}{2} - 1;$$

calculating values of $y_m(r)$ for $$0 \leq r \leq \frac{M}{2} - 1$$

with respect to an upper half of an upper portion of the matrix $Y_m$ by performing calculation with respect to an upper part of an upper portion of a left half of the matrix C and with respect to an upper half of the matrix $X_m$;

calculating the values of $y_m(r)$ with respect to a lower half of the upper portion of the matrix $Y_m$ by inverting the values of $y_m(r)$ with respect to the upper half of the upper portion of the matrix $Y_m$ and by arranging the inverted values in a reverse manner;

calculating the values of $y_m(r)$ for $$0 \leq r \leq \frac{M}{2} - 1$$

with respect to an upper half of a lower portion of the matrix $Y_m$ by performing calculation with respect to an upper part of a lower portion of the left half of the matrix C and with respect to the upper half of the matrix $X_m$; and calculating values of $y_m(r)$ with respect to a lower half of the lower portion of the matrix $Y_m$ by arranging the values of $y_m(r)$ in a reverse manner with respect to the upper half of the lower portion of the matrix $Y_m$.

BRIEF DESCRIPTION OF THE DRAWINGS

The above objects, other features and advantages of the present invention will become more apparent by describing the preferred embodiments thereof with reference to the accompanying drawings, in which the figure is a flow diagram for explaining the method of performing an IMDCT according to the present invention.

DETAILED DESCRIPTION OF THE REFERRED EMBODIMENT

The method for performing an IMDCT according to the present invention will now be explained with reference to the accompanying drawing.

Equation (1) as described above can be expressed in vector form as follows:

$$\begin{bmatrix} y_m(0) \\ y_m(1) \\ \cdot \\ \cdot \\ \cdot \\ y_m(K-1) \end{bmatrix} = [C] \begin{bmatrix} x_0(m) \\ x_1(m) \\ \cdot \\ \cdot \\ \cdot \\ x_{K-1}(m) \end{bmatrix} = Y_m = CX_m \quad (2)$$

Here, the order of the matrix C is $K^2$.

First, if the matrices $Y_m$ and C set forth in equation (2) are laterally divided into halves, respectively, in which an upper half $Y_1$ of the matrix $Y_m$ is composed of $y_m(0)$ to $y_m(M-1)$, and an upper portion of matrix C is called matrix A, the following equation results:

$$\begin{bmatrix} y_m(0) \\ y_m(1) \\ \cdot \\ \cdot \\ \cdot \\ y_m(M-1) \end{bmatrix} = [A] \begin{bmatrix} x_0(m) \\ x_1(m) \\ \cdot \\ \cdot \\ \cdot \\ x_{K-1}(m) \end{bmatrix} = Y_{1m} = AX_m \quad (3)$$

In equation (3), the order of matrix A is M×K, and M=K/2.

Also, if the matrices $Y_m$ and C in equation (2) are laterally divided into halves, respectively, in the same manner as above, and define that a lower half of matrix $Y_m$ is composed of $y_m(M)$ to $y_m(K-1)$ and a lower portion of matrix C is called fatrix B, the following equation results:

$$\begin{bmatrix} y_m(M) \\ y_m(M+1) \\ \cdot \\ \cdot \\ \cdot \\ y_m(K-1) \end{bmatrix} = [B] \begin{bmatrix} x_0(m) \\ x_1(m) \\ \cdot \\ \cdot \\ \cdot \\ x_{K-1}(m) \end{bmatrix} = Y_{2m} = BX_m \quad (4)$$

In equation (4), the order of matrix B is M×K.

If the i-th row element and the j-th column element of matrices A and B are denoted by $A_{i,j}$ and $B_{i,j}$, respectively, the following properties are effected.

Property 1) $A_{(M-1-i),j} = -A_{i,j}$
Property 2) $A_{i,(2M-1-j)} = (-1)^{M+1} A_{i,j}$
Property 3) $B_{(M-1-i),j} = B_{i,j}$
Property 4) $B_{i,(2M-i-j)} = (-1)^{3M-j} B_{i,j}$
Property 5) $X_{K-k}(m) = -X_{K-1}(m)$ The proof of property 1) to property 4) is explained as follows:

property 1) $A_{(M-1-i),j} = -A_{i,j}$.

First, we define $$A_{i,j} = \cos\left( \left( \frac{2\pi}{K} \right) \left( j + \frac{1}{2} \right) (i + n_0) \right).$$

Accordingly, $$A_{(m-1-i),j} = \cos\left( \frac{2\pi}{K} \left( j + \frac{1}{2} \right)(M - 1 - i + n_0) \right) =$$

$$\cos\left( \frac{2\pi}{K} \left( j + \frac{1}{2} \right)(2M - (i + n_0)) \right).$$

Here, the relationship equation, $$n_0 = \frac{M}{2} + \frac{1}{2}$$

is used.

$$A_{(M-1-i),j} =$$

$$\cos\left( \frac{2\pi}{K} \left( j + \frac{1}{2} \right) \cdot 2M \right) \cos\left( \frac{2\pi}{K} \left( j + \frac{1}{2} \right)(i + n_0) \right) +$$

$$\sin\left( \frac{2\pi}{K} \left( j + \frac{1}{2} \right) \cdot 2M \right) \sin\left( \frac{2\pi}{K} \left( j + \frac{1}{2} \right)(i + n_0) \right).$$

In equation (4), we have $$\cos\left( \frac{2\pi}{k} \left( j + \frac{1}{2} \right) \cdot 2M \right) = \cos\left( 2\pi \left( j + \frac{1}{2} \right) \right) =$$

$$\cos(2\pi j)\cos\pi - \sin(2\pi j)\sin\pi = -1$$

$$\sin\left( \frac{2\pi}{k} \left( j + \frac{1}{2} \right) \cdot 2M \right) = \sin\left( 2\pi \left( j + \frac{1}{2} \right) \right) =$$

$$\sin(2\pi j)\cos\pi - \cos(2\pi j)\sin\pi = 0.$$

Thus, equation (4) is expressed as $$A_{(M-1-i),j} = -\cos\left( \frac{2\pi}{K} \left( j + \frac{1}{2} \right)(i + n_0) \right) = -A_{i,j} \quad (5)$$

Property 2)

$$A_{i,(2M-1-j)} = (-1)^{M+1} A_{i,j}$$

$$\begin{aligned} A_{i,(2M-1-j)} &= \cos\left( \frac{2\pi}{K} \left( 2M - 1 - j + \frac{1}{2} \right)(i + n_0) \right) \\ &= \cos\left( 2 \frac{2\pi}{K} \left( 2M - j - \frac{1}{2} \right)(i + n_0) \right) \\ &= \cos\left( \frac{2\pi}{K}(2M)(i + n_0) - \frac{2\pi}{K} \left( j + \frac{1}{2} \right)(i + n_0) \right) \\ &= \cos\left( 2\pi(1 + n_0) - \frac{2\pi}{K} \left( j + \frac{1}{2} \right)(i + n_0) \right) \\ &= (-1)^{(M+1)} \cos\left( \frac{2\pi}{K} \left( j + \frac{1}{2} \right)(i + n_0) \right) \\ &= (-1)^{(M+1)} A_{i,j}. \end{aligned}$$

property 3)

$$B_{(M-1-i),j} = B_{i,j}$$

$$B_{i,j} = (-1)^{i+1}\sin\left( \frac{2\pi}{K} \cdot \left( j + \frac{1}{2} \right)(i + n_0) \right)$$

-continued $$B_{(M-1-i),j} = (-1)^{j+1}\sin\left(\frac{2\pi}{K}(j+1)(M-1-i+n_0)\right)$$

$$= (-1)^{j+1}\sin\frac{2\pi}{K}((j+1)(2M-(i+n_0)))$$

$$= (-1)^{j+1}\sin\left(\frac{2\pi}{K}(j+1)2M\right)$$

$$\cos\left(\frac{2\pi}{K}(j+1)(i+n_0)\right) -$$

$$\cos\left(\frac{2\pi}{K}(j+1)2M\right)$$

$$\sin\left(\frac{2\pi}{K}(j+1)(i+n_0)\right).$$

Here, referring to the proving process of property 1), we have $$= (-1)^{j+1}\sin\left(\frac{2\pi}{K}(j+1)(i+n_0)\right) = B_{i,j}.$$

property 4)

$$B_{i,(2M-1-j)} = (-1)^{(3M-j)}B_{i,j}$$

$$B_{i,(2M-1-j)} = -1)^{(2M-1-j+1)}\sin\left(\frac{2\pi}{K}\left(2M-1-j+\frac{1}{2}\right)(i+n_0)\right)$$

$$= (-1)^{2M-j}\sin\left(\frac{2\pi}{K}\left(2M-\frac{1}{2}-j\right)(i+n_0)\right)$$

$$= (-1)^{2M-j}\left(\sin\left(\frac{2\pi}{K}(2M)(i+n_0)\right)\right.$$

$$\cos\left(\frac{2\pi}{K}\left(j+\frac{1}{2}\right)(i+n_0)\right) -$$

$$\cos\left(\frac{2\pi}{K}(2M)(i+n_0)\right)$$

$$\sin\left(\frac{2\pi}{K}\left(k+\frac{1}{2}\right)(i+n_0)\right)$$

$$= (-1)^{2M-j}\left(-(-1)^{M+1}\left(\sin\left(\frac{2\pi}{K}\left(j+\frac{1}{2}\right)(i+n_0)\right)\right)\right.$$

$$= (-1)^{3M+2-j}B_{i,j} = (-1)^{3M-j}B_{i,j}.$$

The proof of property 5) is disclosed in "A Fast Algorithm for the Implementation of Filter Banks Based on Time Domain Aliasing Cancellation", ICASSP, 1991, PP.2209–2212.

Now, the method for performing an IMDCT according to the present invention will be explained using the above-described properties and with reference to the figure. First, the values of $x_k(m)$ for $$0 \leq k \leq \frac{K}{2} - 1$$

are defined. In detail, only the values of $x_0(m)$ to $$x_{\frac{k}{2}-1}(m),$$

which constitute a half of matrix $X_m$ shown in equation (3), are defined (step 100).

Then, the values of $y_m(r)$ for $$0 \leq r \leq \frac{M}{2} - 1$$

are calculated (step 110). These values are calculated as follows:

$$y_m(r) = \sum_{j=0}^{K-1} A_{r,j}X_j(m)$$

$$\sum_{j=0}^{\frac{K}{2}-1} A_{r,j}X_j(m) + \sum_{j=\frac{K}{2}}^{K-1} A_{r,j}X_j(m)$$

$$\sum_{j=0}^{\frac{K}{2}-1} A_{r,j}X_j(m) + \sum_{j=K-1}^{\frac{K}{2}} A_{r,j}X_j(m)$$

Here, substituting j'=(K-1)-j, we have $$= \sum_{j=0}^{\frac{K}{2}-1} (A_{r,j}X_j(m) + A_{r,K-1-j}X_{K-1-j}(m))$$

Using property (1), since M=K/2, we have $$= \sum_{j=0}^{M-1} A_{r,j}(X_j(m) + (-1)^{M+1}X_{K-1-j}(m))$$

Using property (5), we have $$= \sum_{j=0}^{M-1} A_{r,j}(X_j(m) + (-1)^{M+1}X_{K-1-j}(m))$$

For example, in the Digital Audio Compression (AC-3) standard of the U.S. Advanced Television Systems Committee (ATSC), since M is 256, the value of $y_m(r)$ becomes $$y_m(r) = 2\sum_{j=0}^{M-1} A_{r,j}X_j(m).$$

Accordingly, in order to obtain the values of $y_m(r)$ for $$0 \leq r \leq \frac{M}{2} - 1,$$

M multiplication and M−1 addition operations are required. In order to perform the calculations in steps 110 and 120, M(M/2) multiplication and (M−1)(M/2) addition operations are required.

Using the values of $y_m(r)$, the values of $y_m(M-1-r)$ for $$0 \leq r \leq \frac{M}{2} - 1$$

are obtained (step 120), as follows:

$$y_m(M-1-r) = \sum_{j=0}^{K-1} A_{(M-1-r),j}X_j(m).$$

Using property (2), we have $$= \sum_{j=0}^{K-1} A_{r,j} X_j(m)$$

$$= -\sum_{j=0}^{\frac{K}{2}-1} A_{r,j}(X_j(m) + (-1)^{M+1} X_{K-1-j}(m))$$

$$= -2 \sum_{j=0}^{\frac{K}{2}-1} A_{r,j} X_j(m) = -y_m(r).$$

Thus, we can get $$y_m(M-1) = -y_m(0)$$

$$y_m(M-2) = -y_m(1)$$

$$y_m(M/2) = -y_m(M/2-1)$$

As a result, in order to obtain the values of $y_m(r)$, it is not necessary to separately calculate the values of $y_m(M-1-r)$, rather it is only necessary to invert the values of $y_m(r)$ obtained in step 110, and to arrange the inverted values in a reverse manner in matrix $Y_m$.

The calculation process described above is the process for obtaining matrix $Y_{1m}$ described by equation 3 using the left half of matrix A and the upper half of matrix $X_m$. Specifically, if the values of the upper half or the lower half of matrix $Y_{1m}$ are obtained during the calculation process, the values of the remaining half can be obtained using the previously obtained values. Next, the values of $y_m(r+M)$ for $$0 \leq r \leq \frac{M}{2} - 1$$

are calculated (step 130) as follows:

$$y_m(r+M) = \sum_{j=0}^{K-1} B_{r,j} X_j$$

$$= \sum_{j=0}^{\frac{K}{2}-1} B_{r,j} X_j + \sum_{j=\frac{K}{2}}^{K-1} B_{r,j} X_j$$

$$= \sum_{j=0}^{\frac{K}{2}-1} B_{r,j} X_j + \sum_{j=K-1}^{\frac{K}{2}} B_{r,j} X_j.$$

Here, if it is assumed that $j'=(K-1)-j$, we have $$= \sum_{j=0}^{\frac{K}{2}-1} B_{r,j} X_j + \sum_{j'=0}^{\frac{K}{2}-1} B_{r,(K-1-j')} X_{K-1-j'}.$$

According to property (4)

$$B_{r,K-1-j'} = B_{r,2M-1-j'} = (-1)^{3M-j'} B_{r,j'}.$$

According to property (5), we obtain $$X_{K-1-j'} = X_{K-(j'+1)} = -X_{(j'+1)-1} = -X_{j'}.$$

So that $$y_m(r+M) = \sum_{j=0}^{\frac{K}{2}-1} B_{r,j} X_j + \sum_{j=0}^{\frac{K}{2}-1} (-1)^{3M-j} B_{r,j}(-X_j)$$

$$= \sum_{j=0}^{\frac{K}{2}-1} (B_{r,j} + (-1)^{3M-j+1} B_{r,j}) X_j$$

$$= \sum_{j=0}^{M-1} (B_{r,j} + (-1)^{3M-j+1} B_{r,j}) X_j.$$

Using the above equation, the value of the upper portion of matrix $Y_{2m}$ in equation (4) can be obtained.

Finally, the values of $y_m(2M-r-1)$ for $$0 \leq r \leq \frac{M}{2} - 1$$

are calculated using the values of ym(r+M) (step 140) as follows:

$$y_m(2M-r-1) = \sum_{j=0}^{K-1} B_{M-r-1,j} X_j$$

$$= \sum_{j=0}^{\frac{K}{2}-1} B_{M-r-1,j} X_j + \sum_{j=\frac{K}{2}}^{K-1} B_{M-r-1,j} X_j$$

$$= \sum_{j=0}^{\frac{K}{2}-1} B_{M-r-1,j} X_j + \sum_{j=0}^{\frac{K}{2}-1} B_{M-r-1,K-1-j} X_{K-1-j}.$$

According to property (3)

$$\sum_{j=0}^{\frac{K}{2}-1} B_{M-r-1,j} X_j + \sum_{j=0}^{\frac{K}{2}-1} B_{r,K-1-j} X_{K-1-j}.$$

Also, according to property (3)

$$= \sum_{j=0}^{\frac{K}{2}-1} B_{r,j} X_j + \sum_{j=0}^{\frac{K}{2}-1} B_{r,K-1-j} X_{K-1-j}.$$

And, according to properties (4) and (5)

$$= \sum_{j=0}^{\frac{K}{2}-1} B_{r,j} X_j + \sum_{j=0}^{\frac{K}{2}-1} (-1)^{3M-j} B_{r,j}(-X_j)$$

$$= y_n(r+M).$$

$$= \sum_{j=0}^{\frac{K}{2}-1} (B_{r,j} + (-1)^{3M-j+1} B_{r,j}) X_j$$

Thus, we can get $$y_m(2M-1) = y_m(M)$$

$$y_m(2M-2) = y_m(M+1)$$

$$y_m((3/2)M) = y_m((3/2)M-1)$$

As a result, in order to obtain the values of $y_m(2M-r-1)$, it is not necessary to perform separate calculations for the values of $y_m(2M-r-1)$ for $$0 \leq r \leq \frac{M}{2} - 1,$$

rather it is only necessary to invert the $y_m(r+M)$ obtained in step 130, and to arrange the inverted values in matrix $Y_{2m}$ in a reverse manner.

The calculation process described above is the process for obtaining matrix $Y_{1m}$ in equation 3 using the left half of matrix B and the upper half of matrix $X_m$. Specifically, if the values of the upper half or the lower half of matrix $Y_{2m}$, are obtained during the calculation process, the values of the remaining half can be obtained using the previously obtained values.

Accordingly, in order to obtain the values of $y_m(r+M)$ for $$0 \leq r \leq \frac{M}{2} - 1,$$

M multiplication and M−1 addition operations are required. In order to perform the calculations in steps 130 and 140, M(M/2) multiplication and (M−1)(M/2) addition operations are required.

Consequently, the calculation of $Y_m$ according to the present method requires 2M(M/2) multiplication and M(M−1) addition operations. Since M=K/2, a total of $K^2/4$ multiplication and $((K^2/4)-(K/2))$ addition operations are required. Thus, according to the present invention, the number of calculations can be reduced by a factor of four in comparison to that of the conventional IMDCT method in which $K^2$ multiplication and K(K−1) addition operations are required. In other words, the complexity of the present method becomes $$\frac{K^2}{4} + \frac{K}{2}\left(\frac{K}{2} - 1\right) = \frac{K^2}{2} - \frac{K}{2} = \frac{K}{2}(K-1),$$

while that of the conventional method is $K^2+K(K-1)=2K^2-K=K(2K-1)$.

For example, in the ATSC AC-3 standard, since K is 512, the complexity is 523,776. According to the present method, the complexity is reduced from 523,776 to 130,816, and accordingly the number of calculations is reduced by a factor of 4.0039.

From the foregoing, it will be apparent that the IMDCT method according to the present invention provides advantages in that it can reduce the amount of required calculation, since if half of the upper portion and half of the lower portion of $y_m(r)$ is obtained, the values for the remaining portions can be obtained using the previously obtained values, and calculation of all the values of $y_m(r)$ is not required. The method of performing an IMDCT according to the present invention can be employed in a device in which the method is implemented either in hardware or as a computer program which executes the steps shown in FIG. 1. Accordingly, the size of a memory can be reduced when implementing the IMDCT in hardware, and the calculation speed is greatly improved due to the present invention's simple calculation process. Similarly, when the IMDCT process is implemented with a computer program, the number of processing steps performed by a computing device running the computer program is reduced because the number of required calculations is reduced from that required by the conventional IMDCT process.

While the present invention has been described and illustrated herein with reference to the preferred embodiments thereof, it will be understood by those skilled in the art that various changes in form and details may be made therein without departing from the spirit and scope of the invention.

What is claimed is:

1. A method of performing an inverse modified discrete cosine transform (IMDCT) whereby values of the IMDCT represented by $y_m(r)$ are obtained according to the following equation:

$$y_m(r) = \sum_{k=0}^{K-1} x_k(m)\cos\frac{2\pi}{k}\left(k + \frac{1}{2}\right)(r + n_0)$$

where k is a number of subband channels, $x_k(m)$ are IMDCT coefficients, $$n_0 = \frac{k}{4} + \frac{1}{2},$$

and $0 \leq r \leq K-1$, and $Y_m = CX_m$ where $Y_m$ is a matrix of order 1×K(=2M), C is a matrix of order K×K, and $X_m$ is a matrix of order 1×K, the method comprising:

providing a computing device;

supplying the IMDCT coefficients for $$0 \leq r \leq \frac{K}{2} - 1$$

to said computing device;

using said computing device to calculate values of $y_m(r)$ based on the IMDCT coefficients according to the equation for $$0 \leq r \leq \frac{M}{2} - 1$$

with respect to an upper half of an upper portion of the matrix $Y_m$ by performing calculation with respect to an upper part of an upper portion of a left half of the matrix C and with respect to an upper half of the matrix $X_m$;

using said computing device to calculate the values of $y_m(r)$ with respect to a lower half of the upper portion of the matrix $Y_m$ by inverting the values of $y_m(r)$ with respect to the upper half of the upper portion of the matrix $Y_m$ and by arranging the inverted values in a reverse manner;

using said computing device to calculate the values of $y_m(r)$ based on the IMDCT coefficients according to the equation for $$0 \leq r \leq \frac{M}{2} - 1$$

with respect to an upper half of a lower portion of the matrix $Y_m$ by performing calculation with respect to an upper part of a lower portion of the left half of the matrix C and with respect to the upper half of the matrix $X_m$;

using said computing device to calculate values of $y_m(r)$ with respect to a lower half of the lower portion of the matrix $Y_m$ by arranging the values of $y_m(r)$ in a reverse manner with respect to the upper half of the lower portion of the matrix $Y_m$ and;

outputting from said computing device said values of $y_m(r)$ with respect to the upper half of the upper portion of the matrix $Y_m$, said values with respect to the lower half of the upper portion of the matrix $Y_m$, said values with respect to the upper half of the lower portion of the matrix $Y_m$ and said values of $y_m(r)$ with respect to the lower half of the lower portion of the matrix $Y_m$.

2. A method of performing an inverse modified discrete cosine transform (IMDCT) whereby values of the IMDCT are represented by $y_m(r)$ which are obtained according to the following equation:

$$y_m(r) = \sum_{k=0}^{K-1} x_k(m)\cos\frac{2\pi}{k}\left(k+\frac{1}{2}\right)(r+n_0)$$

where, k is a number of subband channels, $x_k(m)$ are IMDCT coefficients, $$n_0 = \frac{k}{4} + \frac{1}{2},$$

and $0 \leq r \leq K-1$, and
$Y_m = CX_m$
where $Y_m$ is a matrix of order $1 \times K(=2M)$, C is a matrix of order $K \times K$, and $X_m$ is a matrix of order $1 \times K$, the method comprising:
providing a computing device;
supplying the IMDCT coefficients for $$0 \leq r \leq \frac{K}{2} - 1$$

to said computing device;
using said computing device to calculate values of $y_m(r)$ based on the IMDCT coefficients according to the equation for $$0 \leq r \leq \frac{M}{2} - 1$$

with respect to a lower half of an upper portion of the matrix $Y_m$ by performing a calculation with respect to a lower part of an upper portion of a left half of the matrix C and with respect to an upper half of the matrix $X_m$;
using said computing device to calculate values of $y_m(r)$ with respect to an upper half of the upper portion of the matrix $Y_m$ by inverting the values of $y_m(r)$ with respect to the lower half of the upper portion of the matrix $Y_m$ and by arranging the inverted values in a reverse manner;
using said computing device to calculate the values of $y_m(r)$ based on the IMDCT coefficients according to the equation for $$0 \leq r \leq \frac{M}{2} - 1$$

with respect to a lower half of a lower portion of the matrix $Y_m$ by performing calculation with respect to a lower part of a lower portion of the left half of the matrix C and with respect to the upper half of the matrix $X_m$;
using said computing device to calculate the values of $y_m(r)$ with respect to an upper half of the lower portion of the matrix $Y_m$ by arranging the values of $y_m(r)$ in a reverse manner with respect to the lower half of the lower portion of the matrix $Y_m$; and outputting from said computing device said values of $y_m(r)$ with respect to the lower half of the upper portion of the matrix $Y_m$, said values with respect to the upper half of the upper portion of the matrix $Y_m$ said values with respect to the lower half of the lower portion of the matrix $Y_m$ and said values of $Y_m(r)$ with respect to the upper half of the lower portion of the matrix $Y_m$.

3. A method of performing an inverse modified discrete cosine transform (IMDCT) whereby values of the IMDCT represented by $y_m(r)$ are obtained according to the following equation $$y_m(r) = \sum_{k=0}^{K-1} x_k(m)\cos\frac{2\pi}{k}\left(k+\frac{1}{2}\right)(r+n_0)$$

where, k is a number of subband channels, $x_k(m)$ are IMDCT coefficients, $$n_0 = \frac{k}{4} + \frac{1}{2},$$

and $0 \leq r \leq K-1$, and
$Y_m = CX_m$
where, $Y_m$ is a matrix of order $1 \times K(=2M)$, C is a matrix of order $K \times K$, and $X_m$ is a matrix of order $1 \times K$, the method comprising:
providing a computing device;
supplying the IMDCT coefficients for $$0 \leq r \leq \frac{K}{2} - 1$$

to said computing device;
using said computing device to calculate values of $y_m(r)$ based on the IMDCT coefficients according to the equation for $$0 \leq r \leq \frac{M}{2} - 1$$

with respect to a lower half of an upper portion of the matrix $Y_m$ by performing calculation with respect to a lower part of an upper portion of a left half of the matrix C and with respect to an upper half of the matrix $X_m$;
using said computing device to calculate the values of $y_m(r)$ with respect to an upper half of the upper portion of the matrix $Y_m$ by inverting the values of $y_m(r)$ with respect to the lower half of the upper portion of the matrix $Y_m$ and by arranging the inverted values in a reverse manner;
using said computing device to calculate the values of $y_m(r)$ based on the IMDCT coefficients according to the X equation for $$0 \leq r \leq \frac{M}{2} - 1$$

with respect to an upper half of a lower portion of the matrix $Y_m$ by performing calculation with respect to an upper part of a lower portion of the left half of the matrix C and with respect to the upper half of the matrix $X_m$;
using said computing device to calculate the values of $y_m(r)$ with respect to a lower half of the lower portion of the matrix $Y_m$ by arranging the values of $y_m(r)$ in a reverse manner with respect to the upper half of the lower portion of the matrix $Y_m$; and outputting from said computing device said values of $Y_m$ with respect to the lower half of the upper portion of the matrix $Y_m$, said values with respect to the upper half of the upper portion of the matrix $Y_m$, said values with respect to the upper half of the lower portion of the matrix $Y_m$ and said values of $Y_m(r)$ with respect to the lower half of the lower portion of the matrix $Y_m$.

4. A method of performing an inverse modified discrete cosine transform (IMDCT) whereby values of the IMDCT represented by $y_m(r)$ are obtained according to a following equation $$y_m(r) = \sum_{k=0}^{K-1} x_k(m) \cos \frac{2\pi}{k} \left( k + \frac{1}{2} \right) (r + n_0)$$

where k is a number of subband channels, $x_k(m)$ are IMDCT coefficients $$n_0 = \frac{k}{4} + \frac{1}{2},$$

and $0 \leq r \leq K-1$, and
$Y_m = CX_m$
where, $Y_m$ is a matrix of order $1 \times K(=2M)$, C is a matrix of order $K \times K$, and $X_m$ is a matrix of order $1 \times K$, the method comprising:

providing a computing device;

supplying the IMDCT coefficients for $$0 \leq r \leq \frac{K}{2} - 1$$

to said computing device;

using said computing device to calculate values of $y_m(r)$ based on the IMDCT coefficients according to the equation for $$0 \leq r \leq \frac{M}{2} - 1$$

with respect to an upper half of an upper portion of the matrix $Y_m$ by performing calculation with respect to an upper part of an upper portion of a left half of the matrix C and with respect to an upper half of the matrix $X_m$;

using said computing device to calculate the values of $y_m(r)$ with respect to a lower half of the upper portion of the matrix $Y_m$ by inverting the values of $y_m(r)$ with respect to the upper half of the upper portion of the matrix $Y_m$ and by arranging the inverted values in a reverse manner;

using said computing device to calculate the values of $y_m(r)$ based on the IMDCT coefficients according to the equation for $$0 \leq r \leq \frac{M}{2} - 1$$

with respect to a lower half of a lower portion of the matrix $Y_m$ by performing calculation with respect to a lower part of a lower portion of the left half of the matrix C and with respect to the upper half of the matrix $X_m$; and using said computing device to calculate the values of $y_m(r)$ with respect to an upper half of the lower portion of the matrix $Y_m$ by arranging the values of $y_m(r)$ in a reverse manner with respect to the lower half of the lower portion of the matrix $Y_m$; and outputting from said computing device said values of $Y_m(r)$ with respect to the upper half of the upper portion of the matrix $Y_m$, said values with respect to the lower half of the upper portion of the matrix $Y_m$, said values with respect to the lower half of the lower portion of the matrix $Y_m$, and said values of $Y_m(r)$ with respect to the upper half of the lower portion of the matrix $Y_m$.

5. The method recited in claim 1, wherein the calculations of each of said using steps are implemented in a computer program which executes on the computing device.

6. The method recited in claim 2, wherein the calculations of each of said using steps are implemented in a computer program which executes on the computing device.

7. The method recited in claim 3, wherein the calculations of each of said using steps are implemented in a computer program which executes on the computing device.

8. The method recited in claim 4, wherein the calculations of each of said using steps are implemented in a computer program which executes on the computing device.

* * * * *